(12) United States Patent
Butcher et al.

(10) Patent No.: US 8,271,545 B2
(45) Date of Patent: *Sep. 18, 2012

(54) DATABASE PARTITIONING BY VIRTUAL PARTITIONS

(75) Inventors: David L. Butcher, San Mateo, CA (US); Dan Moisa, Mountain View, CA (US); Wendy Tobagus, Mountain View, CA (US); Sunil Kosalge, Union City, CA (US)

(73) Assignee: Google Inc., Mountain View, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 12/897,665

(22) Filed: Oct. 4, 2010

(65) Prior Publication Data

US 2011/0208784 A1 Aug. 25, 2011

Related U.S. Application Data

(63) Continuation of application No. 11/437,598, filed on May 18, 2006, now Pat. No. 7,809,769.

(51) Int. Cl.
*G06F 7/00* (2006.01)
*G06F 17/00* (2006.01)
*G06F 17/30* (2006.01)

(52) U.S. Cl. ........................ 707/803; 707/809

(58) Field of Classification Search .............. 707/696, 707/736, 741, 803, 809
See application file for complete search history.

(56) References Cited

U.S. PATENT DOCUMENTS

| | | | |
|---|---|---|---|
| 5,515,531 | A | 5/1996 | Fujiwara et al. |
| 6,092,061 | A | 7/2000 | Choy |
| 6,473,774 | B1 | 10/2002 | Cellis et al. |
| 6,578,039 | B1 | 6/2003 | Kawamura |
| 2003/0074348 | A1 | 4/2003 | Sinclair et al. |
| 2003/0196065 | A1 | 10/2003 | Ronen et al. |
| 2004/0059700 | A1 | 3/2004 | Park et al. |

FOREIGN PATENT DOCUMENTS

| | | |
|---|---|---|
| EP | 1302873 A2 | 4/2001 |
| WO | 0127746 A2 | 4/2001 |

OTHER PUBLICATIONS

International Search Report and Written Opinion for International Application No. PCT/US2007/069174, mailed on Jan. 22, 2008, 13 pages.
Dewitt et al., "Parallel Database Systems: The Future of High Performance Database Systems," Communications of the ACM, 35(6), pp. 85-98, Jun. 1992.

*Primary Examiner* — Fred I Ehichioya
*Assistant Examiner* — Kris Mackes
(74) *Attorney, Agent, or Firm* — King & Spalding LLP

(57) ABSTRACT

A database may be virtually partitioned into virtual partitions. The virtual partitions are mapped to physical databases of a database. Data records added to the database are each assigned to a virtual partition and stored in the physical database mapped to the assigned virtual partition. The identifier generated for a data record includes an identifier of the assigned virtual partition. When additional databases are created, virtual partitions are remapped to the larger space of physical databases.

20 Claims, 8 Drawing Sheets

800

| Table | Virtual Partition | Last record ID |
|---|---|---|
| A | 0 | 63 |
| A | 1 | 100 |
| A | 2 | 133 |
| ... | ... | ... |
| A | N-1 | X |
| B | 0 | 63 |
| B | 1 | 110 |
| B | 2 | 145 |
| ... | ... | ... |
| B | N-1 | Y |

Figure 8

DATABASE PARTITIONING BY VIRTUAL PARTITIONS

RELATED CASES

This application is a continuation of U.S. application Ser. No. 11/437,598, filed May 18, 2006, now U.S. Pat. No. 7,809,769 entitled "Database Partitioning by Virtual Partitions," which is incorporated herein by reference in its entirety.

TECHNICAL FIELD

The disclosed embodiments relate generally to databases, and more particularly, to methods and systems for partitioning a database.

BACKGROUND

Modern enterprises accumulate a large amount of information. Much of that information is stored in databases. As the information in these enterprises continues to accumulate, the databases grow as well.

One way to deal with a growing database is to partition the database and to store the database partitions in multiple physical databases (e.g., in multiple computers). As the database grows further, it may be further partitioned and additional physical databases may be deployed. When partitioning a database, keeping data that is frequently accessed together or that frequently refers to each other in the same partition is one way to improve the performance of the database after the partitioning. Current partitioning techniques, however, often achieve this by moving data after the partitioning. Not only is this slow, it also makes maintenance of consistency in the database difficult.

Accordingly, there is a need for a more efficient way to partition a database.

SUMMARY

In accordance with some embodiments, a method involves logically partitioning a database into a plurality of virtual partitions and mapping each of the virtual partitions to a respective one of a plurality of physical databases, the plurality of physical databases together forming the database. At least two of the virtual partitions are mapped to a same one of the physical databases. The method also involves inserting a plurality of data records into the database, including assigning each of the plurality of data records to a respective one of the plurality of virtual partitions; and storing each of the plurality of data records in the respective one of the plurality of physical databases to which the corresponding one of the virtual partitions is mapped.

In accordance with some embodiments, a method of adding a data record to a database having a plurality of virtual partitions, where each virtual partition is mapped to one of a plurality of physical databases, includes generating an identifier for the data record, wherein the identifier includes an identifier identifying one of the plurality of virtual partitions, and storing the data record in a respective physical database to which the identified virtual partition is mapped.

In accordance with some embodiments, a system includes memory, one or more processors, and a program, wherein the program is stored in the memory and configured to be executed by the one or more processors. The program includes instructions for logically partitioning a database into a plurality of virtual partitions; instructions for mapping each of the virtual partitions to a respective one of a plurality of physical databases, the plurality of physical databases together forming the database, wherein at least two of the virtual partitions are mapped to a same one of the physical databases; instructions for inserting a plurality of data records into the database, including assigning each of the plurality of data records to a respective one of the plurality of virtual partitions; and instructions for storing each of the plurality of data records in the respective one of the plurality of physical databases to which the corresponding virtual partition is mapped.

In accordance with some embodiments, a system includes one or more physical databases, each having one or more of a plurality of virtual partitions of a database mapped to it, memory, one or more processors, and a program. The program, which is stored in the memory and configured to be executed by the one or more processors, includes instructions for generating an identifier for a data record, wherein the identifier includes an identifier identifying one of the plurality of virtual partitions, and instructions for storing the data record in a respective physical database to which the identified virtual partition is mapped.

In accordance with some embodiments, a computer program product for use in conjunction with a computer system includes a computer readable storage medium and a computer program mechanism embedded therein. The computer program mechanism includes instructions for logically partitioning a database into a plurality of virtual partitions; instructions for mapping each of the virtual partitions to a respective one of a plurality of physical databases, the plurality of physical databases together forming the database, wherein at least two of the virtual partitions are mapped to a same one of the physical databases; instructions for inserting a plurality of data records into the database, including assigning each of the plurality of data records to a respective one of the plurality of virtual partitions; and instructions for storing each of the plurality of data records in the respective one of the plurality of physical databases to which the corresponding virtual partition is mapped.

In accordance with some embodiments, a system includes means for logically partitioning a database into a plurality of virtual partitions; means for mapping each of the virtual partitions to a respective one of a plurality of physical databases, the plurality of physical databases together forming the database, wherein at least two of the virtual partitions are mapped to a same one of the physical databases; means for inserting a plurality of data records into the database, including means for assigning each of the plurality of data records to a respective one of the plurality of virtual partitions; and means for storing each of the plurality of data records in the respective one of the plurality of physical databases to which the corresponding virtual partition is mapped.

BRIEF DESCRIPTION OF THE DRAWINGS

FIG. 8 is a diagram illustrating a last data record table in accordance with some embodiments.

Like reference numerals refer to corresponding parts throughout the drawings.

DESCRIPTION OF EMBODIMENTS

A database may be partitioned into virtual partitions. Data records inserted into the database are assigned to a virtual partition. Each virtual partition is associated with and mapped to a physical database. Data records assigned to a virtual partition are stored in the physical database to which the virtual partition is mapped. As additional physical databases for the database are created, virtual partitions may be remapped to different physical databases and the data records may be stored at different physical databases in accordance with the updated mapping.

Figure 1:
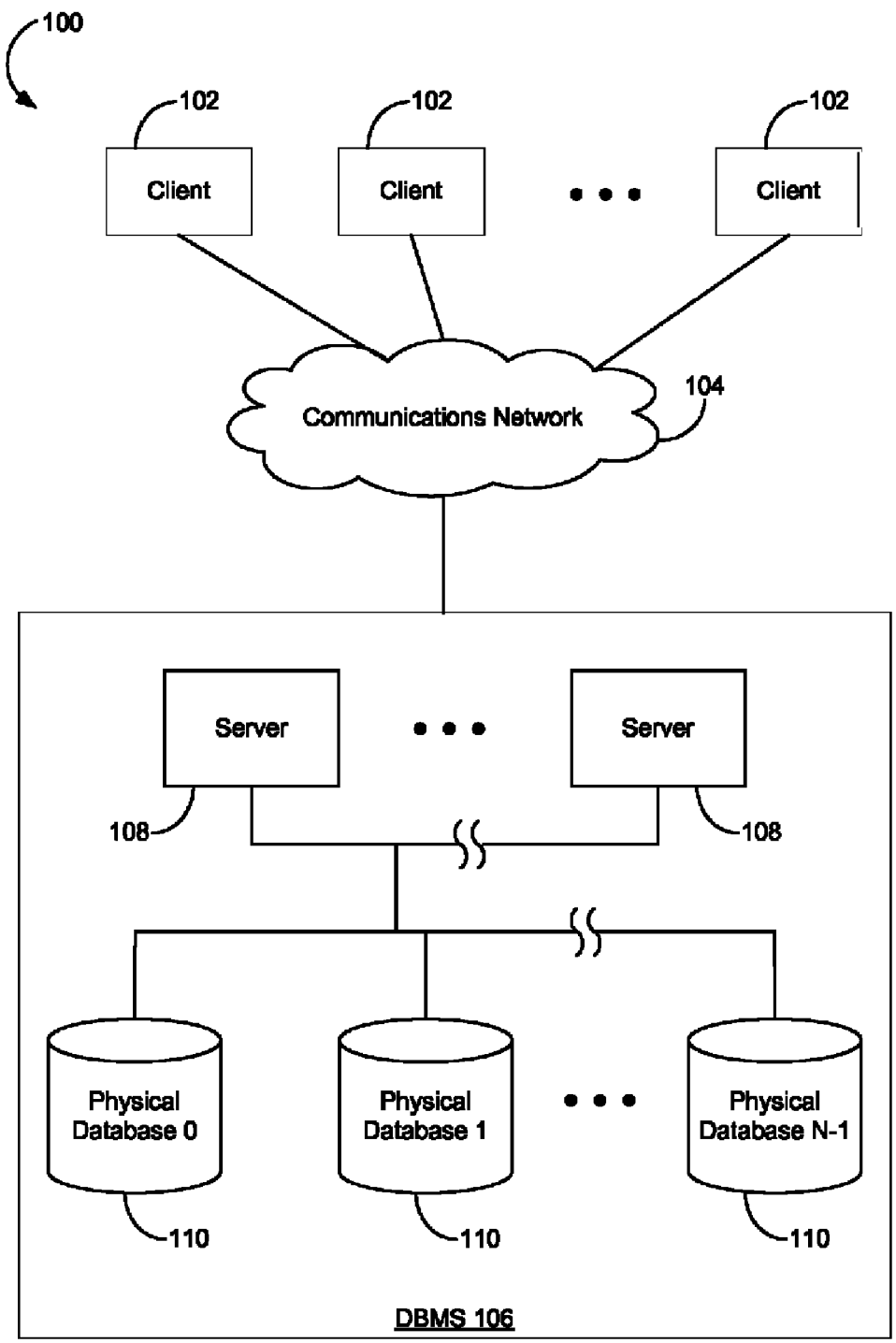
FIG. 1 is a block diagram illustrating a computer network that includes a database management system in accordance with some embodiments.

FIG. 1 is a block diagram illustrating a computer network that includes a database management system in accordance with some embodiments. The computer network 100 includes one or more clients 102 and a database management system (DBMS) 106. One or more communications networks 104 may interconnect these components. The communications network 104 may be any of a variety of networks, including local area networks (LAN), wide area networks (WAN), wireless networks, wireline networks, the Internet, or a combination of such networks.

A client 102 queries for and receives data from the DBMS 106. The client 102 may be any computer or other device that is capable of communicating with the DBMS 106. Examples include, without limitation, desktop and notebook computers, mainframe computers, server computers, mobile devices such as mobile phones and personal digital assistants, network terminals, and set-top boxes.

The database management system (DBMS) 106 stores a database and provides data from the database to other computers. The DBMS 106 includes one or more servers 108 and one or more physical databases 110. The servers 108 act as the front end of the DBMS 106. The servers 108 receive requests for data from clients 102, retrieve the requested data from the physical databases 110, and return the requested data to the client 102. In some embodiments, the servers 108 provide a Web-based interface through which data requests may be made and the requested data may be displayed. The internal structure of the DBMS 106 is transparent to the client 102; from the viewpoint of the client 102, the DBMS 106 is one database, even if there are multiple physical databases 110.

The data of the DBMS database is stored in the physical databases 110. The DBMS 106 may have one or more physical databases 110. The number of physical databases 110 may vary depending on the amount of data stored in the DBMS 106. As the amount of data increases, the number of physical databases 110 in the DBMS 106 may be increased.

As used herein, a database is a collection of data records. A physical database is the whole database, or a portion thereof, as defined by its physical location, e.g., a particular computer, server, or non-volatile memory device. For example, a database may be divided into two portions and each portion stored at a respective computer. The portions on the two computers are the two physical databases of the database. In some embodiments, a physical database may be viewed as a database as well; a physical database is a database within the overall database, comprising at least a subset of data records from the overall database A database may be logically or virtually partitioned into virtual partitions. The virtual partitions are groupings of the data records in the database, where the groupings are formed based on predefined rules or criteria. Each virtual partition is associated with and mapped to a single physical database at any moment, and may be remapped to a different physical database as additional physical databases are created. All data records within a virtual partition are stored in the physical database to which the virtual partition is mapped. A physical database can store data records belonging to one or more virtual partitions that are mapped to the physical database.

As described above, the database is a collection of data records. As used herein, a data record is a single data item within the database. An example of a data record is a row in a table in a relational database. In some embodiments, the data records may be organized as tables, as in a relational database. For example, in a database of customer data and transactions by customers, there may be a table of customer records and a table of transaction records. In some circumstances a data record may include a file, such as an image file, document file or the like that is referenced by an entry in a table of the database.

In some embodiments, the data records include primary and secondary data records. A primary data record is a data record that is not dependent on another data record; the primary data record is typically the first data record of a set of related data records to be produced or stored, and thus is the first data record of the set to be assigned a location in the database. A secondary or subsidiary data record is a data record that is dependent on or refers to, and is associated with a primary data record. The secondary data record refers to a primary data record and is associated with that primary data record. For example, in an exemplary database of customer data and transactions by customers, a customer data record is a primary data record. A customer data record is independent of other customer records and is not associated with or dependent on other data records. On the other hand, transaction records are secondary data records, wherein each transaction record is associated with a particular customer, namely the particular customer that engaged in the transaction.

Figure 2:
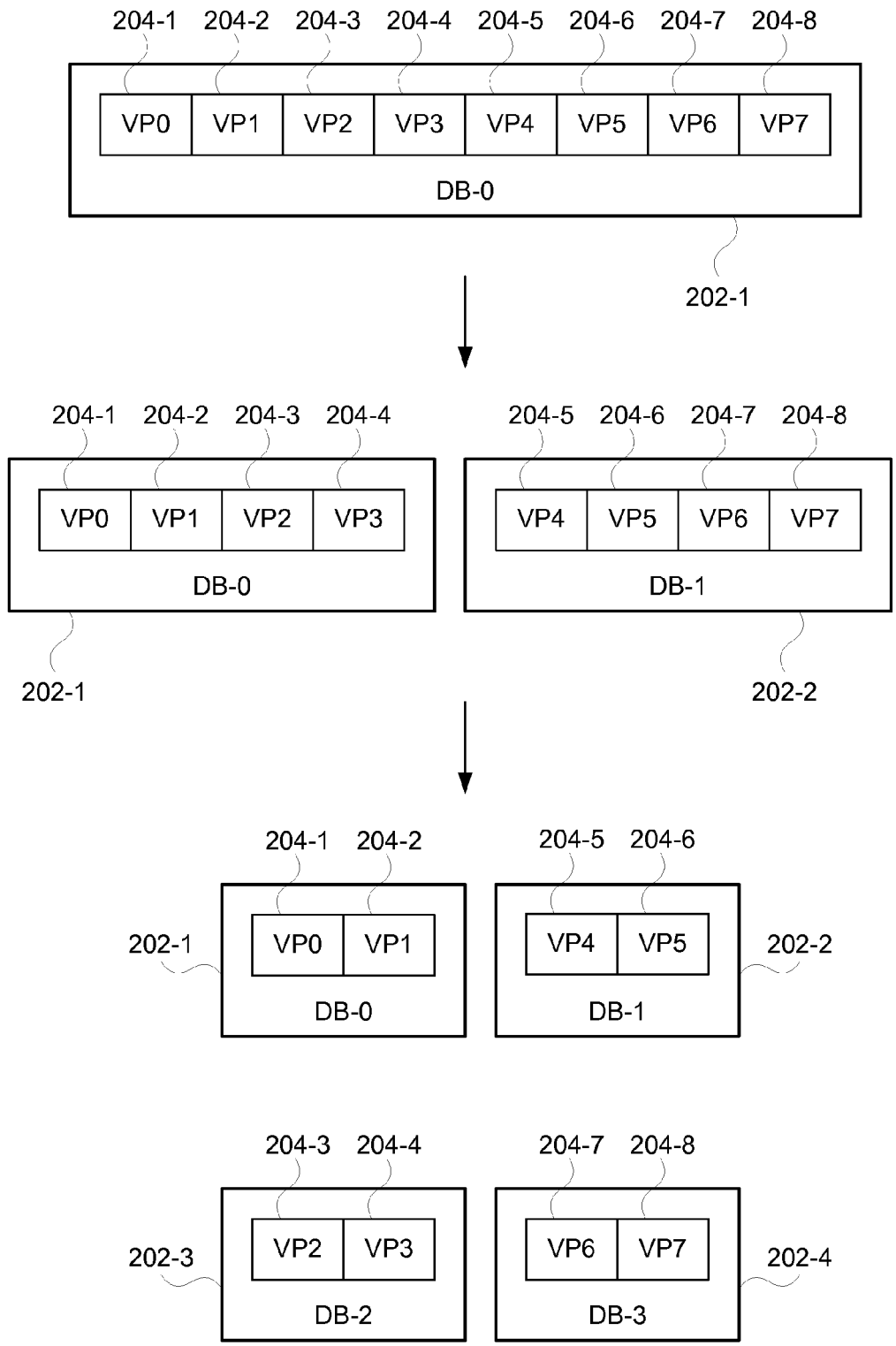
FIG. 2 is a conceptual diagram illustrating the partitioning of a physical database in accordance with some embodiments.

FIG. 2 is a conceptual diagram illustrating the partitioning of an exemplary physical database in accordance with some embodiments. A physical database 202-1 in a DBMS may have a plurality of virtual database partitions 204-1 thru 204-8 associated with and mapped to it. Any data record that is assigned to these virtual partitions 204-1 thru 204-8 is stored in the physical database 202-1. As the database grows, additional physical databases may be created within the DBMS. Some of the data that is stored in the physical database 202-1 is divided amongst the additional physical databases. For example, with two physical databases 202-1 and 202-2, virtual partitions 202-4 thru 202-8 are remapped to physical database 202-2 and data in these virtual partitions are stored in physical database 202-2.

As the database grows further, additional physical databases 202-3 and 202-4 may be created. The virtual partitions 204-3 and 204-4 are remapped to physical database 202-3, and virtual partitions 204-7 and 204-8 are remapped to physical database 202-4. Data records of these virtual partitions are stored in physical databases 202-3 and 202-4 based on the updated remapping of virtual partitions. The dividing and remapping may continue until there is a one-to-one correspondence between virtual partitions and physical databases.

In some embodiments, "moving" data records from a first to a second physical database involves copying the entire set of data records stored at the first physical database to the second physical database, and then removing the unassociated data records at the first physical database and the second physical database. For example, say that two data records DR1 and DR2, each assigned to different virtual partitions, are stored at a physical database A. A new physical database B is created and the virtual partition to which DR2 is associated is newly associated with physical database B. To "move" DR2 to physical database B, both DR1 and DR2 are copied to physical database B. DR1 is removed at physical database B and DR2 is removed at physical database A. As a result, DR2 is now stored at physical database B and is no longer stored at physical database A, and vice versa for DR1.

Figure 3:
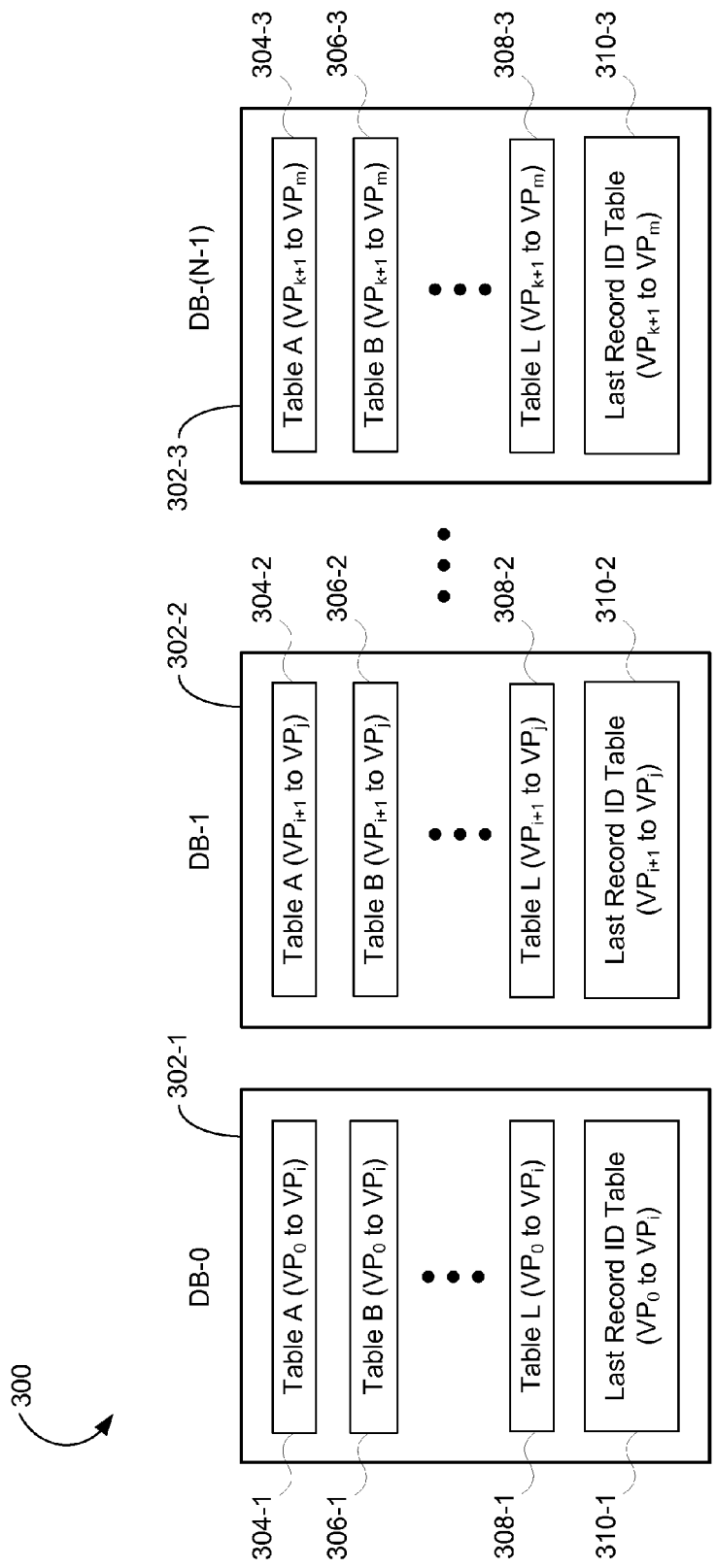
FIG. 3 is a conceptual diagram illustrating physical databases of a database and corresponding table portions in accordance with some embodiments.

FIG. 3 is a conceptual diagram illustrating the physical databases of a database and corresponding portions of database tables in accordance with some embodiments. A database 300 may have N physical databases DB-0 thru DB-(N−1) (302-1 thru 302-3). The database 300 may also be partitioned into virtual partitions 0-$m$. The data records of the database are organized as one or more tables A-L (304, 306, 308). The database also includes a last record identifier table 310. The last record identifier table 310 tracks the next available record identifier (or last used record identifier) values per virtual partition per table. Further details regarding the last record identifier table are described below, in relation to FIG. 8.

The tables 304, 306, 308 and the last record identifier table 310 are all partitioned into virtual partitions. More particularly, the data records in the 304, 306, 308 and the last record identifier table 310 are assigned to virtual partitions, and thus the tables are partitioned based on the assignment of the data records to the virtual partitions. Table partitions 304-1, 306-1, 308-1 assigned to virtual partitions 0 thru i, i.e. data records in the tables 304, 306, 308 that are assigned to virtual partitions 0 thru i, are stored in physical database DB-0 (302-1). Table partitions 304-2, 306-2, 308-2 assigned to virtual partitions i+1 thru j, i.e., data records in the tables 304, 306, 308 that are assigned to virtual partitions i+1 thru j, are stored in physical database DB-1 (302-2). Table partitions 304-3, 306-3, 308-3 assigned to virtual partitions k+1 thru m, i.e., data records in the tables 304, 306, 308 that are assigned to virtual partitions k+1 thru m, are stored in physical database DB-(N−1) (302-3).

The last record identifier table 310 is also stored in a similar manner: records 310-1 of the last record identifier table that are tracking virtual partitions 0 thru i are stored in physical database DB-0 (302-1). Records 310-2 of the last record identifier table that are tracking virtual partitions i+1 thru j are stored in physical database DB-1 (302-2). Records 310-3 of the last record identifier table that are tracking virtual partitions k+1 thru m are stored in physical database DB-(N−1) (302-3).

Figure 4:
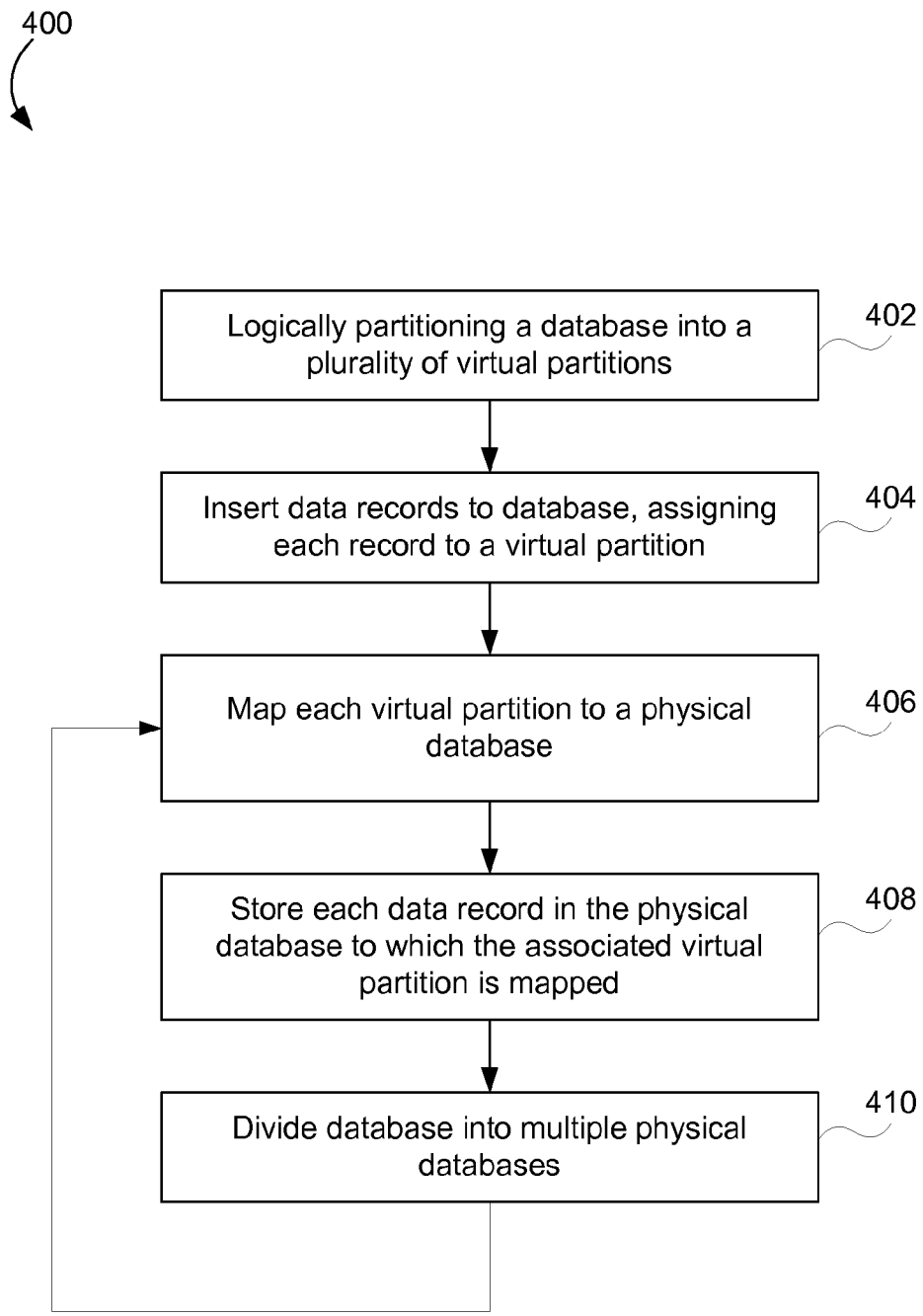
FIG. 4 is a flow diagram illustrating a process for partitioning a database in accordance with some embodiments.

FIG. 4 is a flow diagram illustrating a process for partitioning a database in accordance with some embodiments. Process flow 400 describes a process for virtually partitioning a database and storing data records assigned to the virtual partitions in physical databases.

The database is logically partitioned into a plurality of virtual partitions (402). Data records are inserted into the database and each data record is assigned to a virtual partition (404). The virtual partitioning of the database is achieved by allocating record identifier values to data records in a particular manner. A segment of the record identifier value is dedicated to identifying the assigned virtual partition. When a data record is inserted into the database, a value is set in accordance with predefined rules or criteria for the segment of the identifier that identifies the virtual partition. In other words, the database is partitioned by "tagging" the data records with the identifiers of the virtual partitions to which they have been assigned. Further details regarding the generation of record identifier values are described below in relation to FIG. 5.

The number of virtual partitions in the database is defined in advance and is reflected in the size of the virtual partition identifier segment of the record identifier. In some embodiments, the number is defined based on an estimate of the size of the database and anticipated future growth of the database.

Each virtual partition is associated with and mapped to a physical database (406). The mapping may be arbitrary or in accordance with a predefined rule. For example, virtual partitions may be distributed amongst the physical databases in round-robin order, by a modulus-based scheme, or any other suitable predefined association scheme. Each data record is stored in the physical database to which the associated virtual partition (i.e., the virtual partition to which the data record belongs) is mapped (408).

It should be appreciated that any data record that is inserted to the database, at any point in the life of the database, is assigned to a virtual partition that is active at that point and stored in an active physical database to which the assigned virtual partition is mapped, regardless of when the data record is inserted.

Additional physical databases are created within the database and the database is divided amongst the increased number of physical databases (410). Whenever the database grows sufficiently large, additional physical databases may be created and the data records of the database are divided amongst the existing and new physical databases; the database is divided into more and more physical databases as it grows. The virtual partitions are remapped to the post-division physical databases (406) and the data records are stored in accordance with the updated virtual partition-physical database mappings (408). As the database grows further, further divisions may be performed (410), the virtual partitions are remapped (406), and the data records are stored in the physical databases in accordance with the updated mappings (408). The process of dividing the database into physical databases, mapping virtual partitions to physical databases, and storing the data records continues up to when there is a one-to-one correspondence between virtual partitions and physical databases, i.e., there is exactly one virtual partition mapped to each physical database and each physical database is mapped to a different virtual partition, and the data records are stored in accordance with the one-to-one correspondence. However, in some embodiments, the total number of virtual partitions may be increased, further details of which are described below in relation to FIG. 6.

Figure 5:
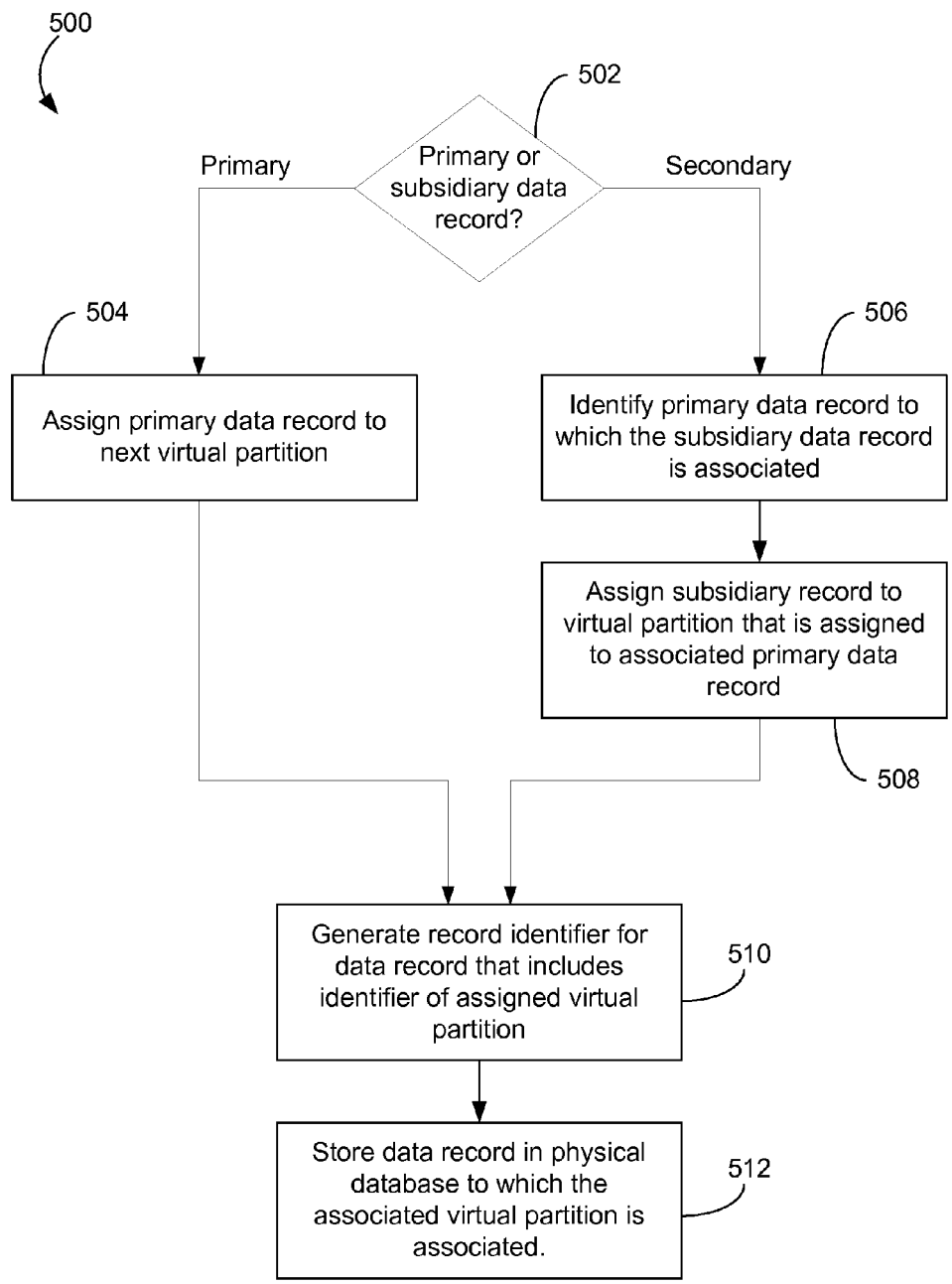
FIG. 5 is a flow diagram illustrating a process for assigning data records to virtual partitions in accordance with some embodiments.

FIG. 5 is a flow diagram illustrating a process 500 for assigning data records to virtual partitions in accordance with some embodiments. The process for assigning a data record to a virtual partition differs slightly depending on whether the data record is a primary or secondary data record. If the data record is a primary data record (502—Primary), the data record is assigned to a virtual partition (504). In some embodiments, the assignment of a virtual partition is performed in a round-robin order. For example, if there are 3 virtual partitions, data records are assigned one at a time to the virtual partitions as they are inserted into the database, first to the first partition, then to the second partition, then to the third partition, then back to the first partition again, and so forth. In some other embodiments, the data record is assigned a virtual partition randomly or pseudo-randomly. In yet other embodiments, the data records are assigned to virtual partitions in accordance with a load balancing strategy, with new primary data records being assigned to virtual partitions having the lowest loads.

If the data record is a secondary data record (502—Secondary), then the primary data record with which the secondary data record is associated is identified (506). In some embodiments, the identifier of the associated primary data record is included in the secondary data record itself. The secondary data record is assigned to the virtual partition to which the associated primary data record is assigned (508). In some embodiments, this includes extracting the virtual partition identifier segment from the identifier of the associated primary data record and using that as the virtual partition identifier value in the identifier of the secondary data record. By assigning the secondary data record to the same virtual partition as that assigned to the primary data record, the assignment process ensures that the primary record and the associated secondary record are stored in the same physical database.

The assignment of a virtual partition to a data record is permanent; the data record is associated with the same virtual partition for the entire life of the data record. The data record is not reassigned to a different virtual partition, even as the database is divided among increasing numbers of physical databases. As a result, the record identifier of a record is also permanent and does not change.

A record identifier is generated for the data record (510). The record identifier includes a segment that identifies the assigned virtual partition and a segment for a sequentially allocated value. The virtual partition identifier segment is set in accordance with the virtual partition that is assigned as described above. The sequentially allocated value is set to the next available sequential value within the table-virtual partition to which the data record is assigned. The next available sequential value is derived from the last record identifier table, further details of which are described below in relation to FIG. 8. The data record is stored in the physical database to which the assigned virtual partition is mapped (512).

Figures 6, 7:
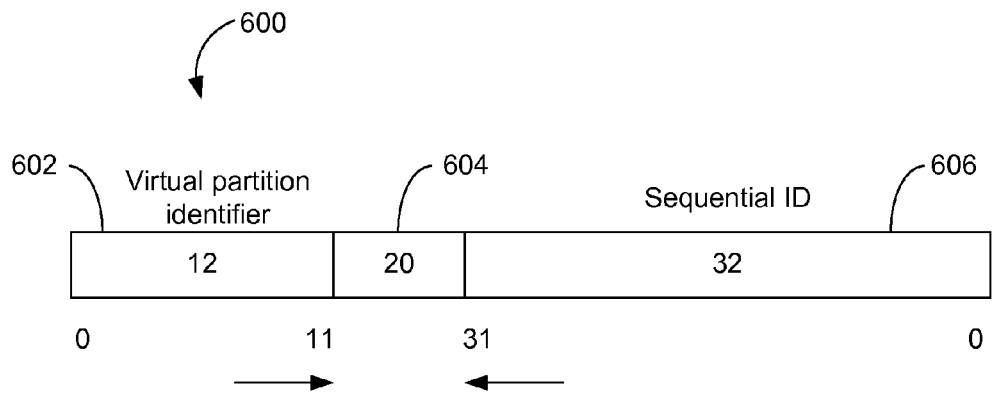
FIG. 6 is a diagram illustrating a data record identifier in accordance with some embodiments.
FIG. 7 is a diagram illustrating a virtual partition to physical database mapping in accordance with some embodiments.

FIG. 6 is a diagram illustrating a data record identifier in accordance with some embodiments. The record identifier 600 is an exemplary identifier of a data record in a database. In some embodiments, the record identifier 600 is a 64-bit value. The record identifier 600 includes the virtual partition identifier segment 602, the sequential identifier segment 606, and buffer bits 604.

The virtual partition identifier 602 identifies the virtual partition to which the data record is assigned. In some embodiments, the virtual partition identifier 602 is a 12-bit segment within a 64-bit record identifier. Furthermore, in some embodiments, the least significant bit of the virtual partition identifier 602 is at the leftmost end of the record identifier 600, with the more significant bits toward the right. As shown in FIG. 6, bit 0 of the virtual partition identifier 602, the least significant bit, is on the leftmost end of the record identifier 600, and the more significant bits are in positions to the right of bit 0.

The sequential identifier 606 identifies the data record within the virtual partition of the table to which the data record belongs. In some embodiments, the sequential identifier is a 32-bit segment within a 64-bit record identifier. Furthermore, in some embodiments, the least significant bit of the sequential identifier 606 is at the rightmost end of the record identifier 600, with the more significant bits toward the left. As shown in FIG. 6, bit 0 of the sequential identifier 606, the least significant bit, is on the rightmost end of the record identifier 600, and the more significant bits are in positions to the left of bit 0.

The record identifier 600 also includes a segment of buffer bits 604. In some embodiments, the buffer bits are 20 bits long in a 64-bit record identifier; the buffer bits are the remaining bits after the 12-bit virtual partition identifier and the 32-bit sequential identifier are subtracted from the 64-bit record identifier. The number of virtual partitions may be increased by taking bits from the buffer bits 604 that are adjacent to the virtual partition identifier segment 602 and incorporating them into the virtual partition identifier segment 602. In other words, the virtual partition identifier segment is expanded at the expense of the buffer bits. This increases the number of available virtual partitions. Similarly, the size of virtual partitions may be increased by taking bits from the buffer bits 604 that are adjacent to the sequential identifier segment 606 and incorporating them into the sequential identifier segment 606. In other words, the sequential identifier segment is expanded at the expense of the buffer bits. In some embodiments, the buffer bits of each record identifier are set to 0. Only when buffer bits are reassigned to the virtual partition identifier 602 or the sequential identifier 606 are these bits assigned values other than zero.

However, it should be appreciated that expansions of the virtual partition identifier and sequential identifier segment may be limited. Because of the differing arrangements of least and most significant bits as described above, the expansions of the segments are inward, as indicated by the directions of the arrows in FIG. 6. Eventually, the most significant bits of the virtual partition identifier and sequential identifier segment will be adjacent to each other. At that point, no further expansion of the virtual partition identifier and sequential identifier segments is possible, unless the total number of bits in the record identifier 600 is increased.

The format of the record identifier 600 is applicable to all tables; all data records in all tables in the database have the same record identifier format and the same lengths for the virtual partition identifier and the sequential identifier. Thus, all tables of the database have the same number of virtual partitions and the range of sequential identifier values for all table-virtual partitions of the database is the same.

In some embodiments, the data record identifier 600 uniquely identifies a data record within a table, but not within the entire database. In order to uniquely identify a data record in the entire database, the identity of the table to which the data record belongs is combined with the data record identifier. For example, in order to uniquely identify a data record in a table of customer data, the identity of the customer data table and the identifier of the data record are both needed. Thus, the unique identifier of a data record in the database is an identifier of the table to which the data record belongs and the data record identifier. In some other embodiments, at least some of the buffer bits 604 in a data record identifier 600 may be used to identify the table to which a data record belongs. This will make a data record identifier 600 globally unique within the entire database.

As described above, the virtual partition assignment for a data record is permanent. Furthermore, the sequential identifier allocated to a data record is permanent. Thus, the record identifier is permanent. Because the record identifier is permanent and does not change despite changes in the virtual partition-physical database mappings, a record identifier remains valid even as the corresponding data record is stored in different physical databases.

It should be appreciated that the record identifier described above is merely exemplary. The record identifier may take on different forms. For example, in some embodiments, the record identifier of a data record may be a combination of a string identifying the virtual partition and a sequential identifier value. In this example, the unique identifier of the data record is a combination of an identifier of the table to which the data record belongs, the string identifying the virtual partition, and the sequential identifier value.

FIG. 7 is a diagram illustrating a virtual partition to physical database mapping in accordance with some embodiments. In some embodiments, the virtual partition to physical database mapping 700 may be a table of virtual partitions 702 and mapped physical databases 704. In some other embodiments, the mapping may simply be a list of virtual partition to physical database correspondences. Each virtual partition maps to a single physical database, but more than one virtual partition may be mapped to a particular physical database. In other words, a virtual partition cannot be associated with a plurality of physical databases simultaneously, but a physical database may be associated with one or more virtual partitions simultaneously.

The mapping 700 is stored in each of the servers 108. A server 108 creates the mapping 700 by polling each of the physical databases 110 for the virtual partitions that are assigned to it. Based on the responses from the physical databases, the server 108 generates the mapping 700. The polling may be performed whenever the DBMS starts up and when additional physical databases are created.

A physical database may, at some point, become unavailable. The unavailability may be caused by, among other things, a malfunction or a deliberate deactivation in order to perform system maintenance. As a result, the virtual partitions assigned to that physical database are unavailable until the operation of the physical database is restored. However, the DBMS may continue functioning. When physical databases are polled for their assigned virtual partitions, an unavailable physical database is unable to respond, and thus is not included in the mapping 700. However, the unavailable physical database may be included in the mapping 700 again after it becomes available and is polled.

FIG. 8 is a diagram illustrating a last data record table or last record identifier table 800 in accordance with some embodiments. Each physical database includes a last data record table. The last data record table 800 tracks the next available sequential identifier value (or last used sequential identifier value) per virtual partition per table, for all virtual partitions mapped to the physical database. The last data record table 800 includes records 801 for each table-virtual partition in the physical database. A record 801 identifies a corresponding table 802 and virtual partition 804. Also in the record 801 is the next available sequential identifier value 806 (or, alternately, the last used sequential identifier value) for that table-virtual partition. Whenever a data record is inserted into a table of the database, a table-virtual partition in which to store the data record is identified, and a record identifier is generated for the data record. The value used of the sequential identifier segment of the record identifier for the new data record is the next available sequential identifier value for that table-virtual partition.

In some embodiments, the next available sequential identifier value 806 for that table-virtual partition is incremented, so that the next data record to be added to the table-virtual partition gets the incremented value. For example, if a data record is added to table A and assigned to virtual partition 0, the data record would get the sequential identifier value of 63. The next data record added to table A and assigned to virtual partition 0 will get the sequential identifier value of 64. In some other embodiments, the identifier values 806 for a record 801 need not actually be sequential as long as the identifier values are distinct. For example, the next available identifier values 806 for a record 801 may be encrypted values that are not necessarily sequential. More generally, the identifier values 806 for a record 801 may be generated by any suitable scheme as long as the values are distinct at least with respect to the table-virtual partition corresponding to the record 801.

As described above in relation to FIG. 3, the last data record table or last record identifier table is partitioned amongst the virtual partitions of the database and the partitions are stored in the physical databases. Each record 801 in the last data record table 800 is assigned to a virtual partition. More particularly, each record 801 is assigned to the virtual partition that is identified in the corresponding virtual partition field 804.

Whenever a new table is added to the database, the table is subject to the virtual partitioning. The table is assigned to virtual partitions and the data in the table are stored in at least a subset of the physical databases based on the virtual partition assignments. A record 801 corresponding to the new table is added to the last data record table 800 for each virtual partition.

Figure 9:
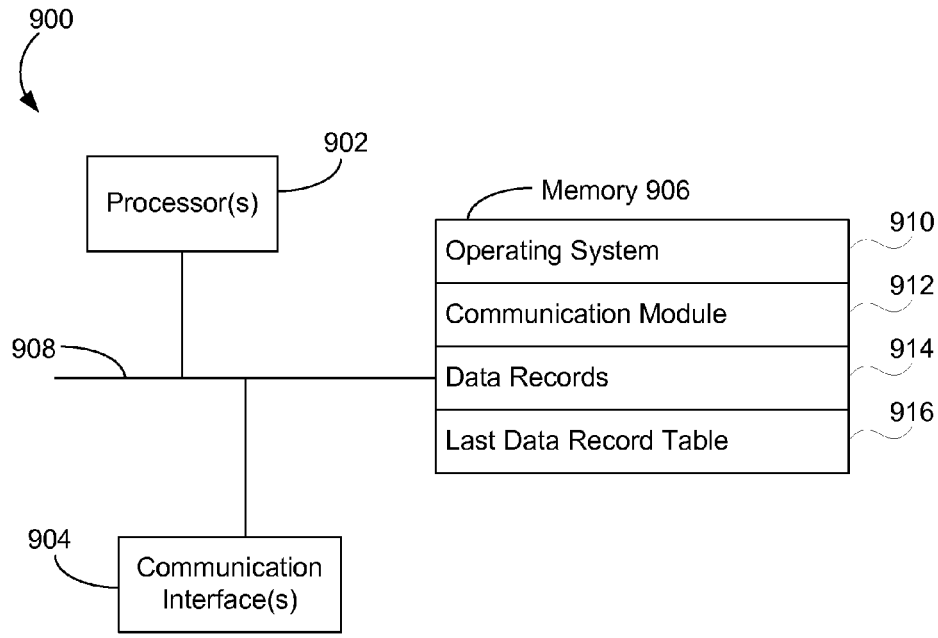
FIG. 9 illustrates a physical database computer in accordance with some embodiments.

FIG. 9 illustrates a physical database computer 900 in accordance with some embodiments. The physical database computer 900 may correspond to one of the physical databases 110 shown in FIG. 1, and typically includes one or more processing units or CPU's 902, one or more network or other communications interfaces 904, memory 906, and one or more communication buses 908 for interconnecting these components. The communication buses 908 may include circuitry (sometimes called a chipset) that interconnects and controls communications between system components. The physical database computer 900 optionally may include a user interface comprising a display device and a keyboard (not shown). Memory 906 (which may comprise or include a computer readable storage medium) includes random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 906 may optionally include one or more storage devices remotely located from the CPU(s) 902. In some embodiments, memory 906 stores the following programs, modules and data structures, or a subset thereof:

- an operating system 910 that includes procedures for handling various basic system services and for performing hardware dependent tasks;
- a network communication module 912 that is used for connecting the physical database computer 900 to other computers via the one or more communication network interfaces 904 (wired or wireless), such as the Internet, other wide area networks, local area networks, metropolitan area networks, and so on;
- database data records 914; and
- a last data record table 916 for storing next available sequential identifier values (or last used sequential identifier values) for those table-virtual partitions that are stored in the physical database services by this computer 900; the last data record table 916 is partitioned in accordance with the same virtual partitions that are used to partition the data tables in the database.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 906 may store a subset of the modules and data structures identified above. Furthermore, memory 906 may store additional modules and data structures not described above.

Although FIG. 9 shows a "physical database computer," FIG. 9 is intended more as functional description of the various features which may be present in a set of servers than as a structural schematic of the embodiments described herein. In practice, and as recognized by those of ordinary skill in the art, items shown separately could be combined and some items could be separated.

Figure 10:
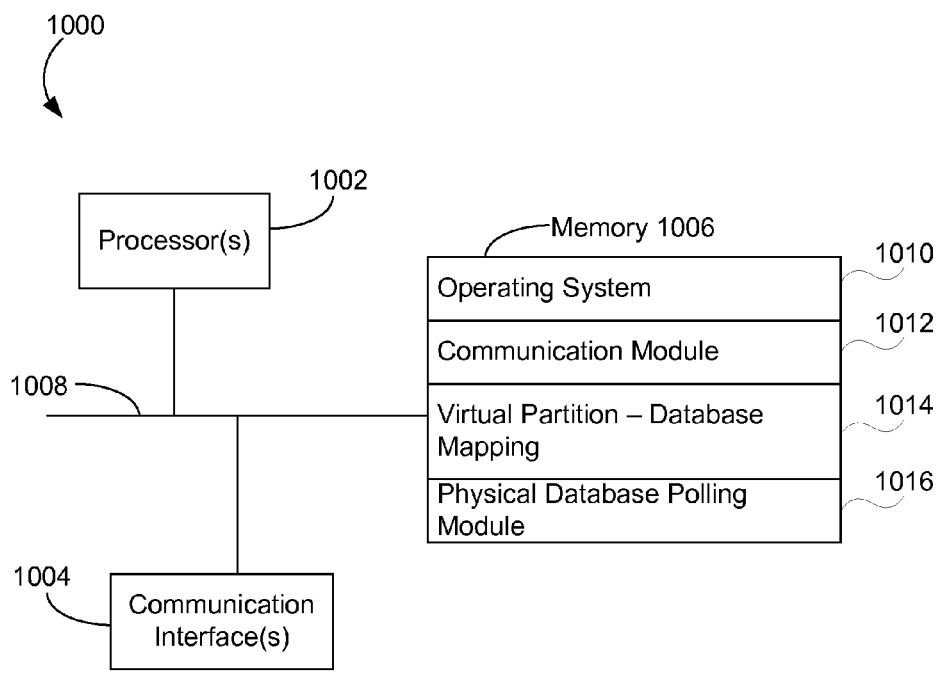
FIG. 10 illustrates a server computer in accordance with some embodiments.

FIG. 10 illustrates a server computer 1000 in accordance with some embodiments. The server computer 1000 may correspond to one of the servers 108 shown in FIG. 1, and typically includes one or more processing units or CPU's 1002, one or more network or other communications interfaces 1004, memory 1006, and one or more communication buses 1008 for interconnecting these components. The communication buses 1008 may include circuitry (sometimes called a chipset) that interconnects and controls communications between system components. The server computer 1000 optionally may include a user interface comprising a display device and a keyboard (not shown). Memory 1006 (which may comprise or include a computer readable storage medium) includes random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1006 may optionally include one or more storage devices remotely located from the CPU(s) 1002. In some embodiments, memory 1006 stores the following programs, modules and data structures, or a subset thereof:

- an operating system 1010 that includes procedures for handling various basic system services and for performing hardware dependent tasks;
- a network communication module 1012 that is used for connecting the server computer 1000 to other computers via the one or more communication network interfaces 1004 (wired or wireless), such as the Internet, other wide area networks, local area networks, metropolitan area networks, and so on;
- a virtual partition—physical database mapping 1014 for mapping virtual partitions to physical databases;
- a physical database polling module 1016 for polling physical databases regarding associated virtual partitions and generating the virtual partition—physical database mapping.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 1006 may store a subset of the modules and data structures identified above. Furthermore, the memory 1006 may store additional modules and data structures not described above.

Although FIG. 10 shows a "server computer," FIG. 10 is intended more as functional description of the various features which may be present in a set of servers than as a structural schematic of the embodiments described herein. In practice, and as recognized by those of ordinary skill in the art, items shown separately could be combined and some items could be separated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for increasing a first number of virtual partitions in a database comprising:
    a computer program stored in a memory within a computer, the computer comprising a processor, the computer program accessing the database with the first number of virtual partitions, wherein accessing the database comprises mapping each of the first number of virtual partitions to one of a plurality of physical databases, the plurality of physical databases together forming the database;
    the computer program associating a record identifier with each of a plurality of data records, the record identifier comprising a virtual partition identifier corresponding to one of the first number of virtual partitions in the database to which a data record of the plurality of data records is assigned;
    the computer program, in response to an increase in the first number of virtual partitions to a second number of virtual partitions, increasing a number of bits used in the virtual partition identifier without increasing a length of the record identifier associated with each of the plurality of data records.

2. The method of claim 1, wherein the step of increasing the number of bits used in the virtual partition identifier comprises using a bit from a plurality of buffer bits included in the record identifier.

3. The method of claim 1, wherein the record identifier further comprises a sequential identifier that identifies the data record within the virtual partition.

4. The method of claim 3, wherein the computer program, in response to an increase in the size of the virtual partition, increases the number of bits used in the sequential identifier without increasing the length of the record identifier associated with the plurality of data records by adding a bit to the sequential identifier from a plurality of buffer bits included in the record identifier.

5. The method of claim 1, wherein the virtual partition identifier is located in a first segment of the record identifier and a second segment of the record identifier comprises a sequential identifier for the data record.

6. The method of claim 5, wherein one of the virtual partition identifier and the sequential identifier has a least significant bit at a leftmost end and one of the virtual partition identifier and the sequential identifier has a least significant bit at a rightmost end.

7. The method of claim 1, wherein at least two of the virtual partitions are mapped to a same one of the physical databases.

8. A system comprising:
a memory;
a processor; and
a computer program stored in the memory and configured to be executed by the processor, the computer program comprising:
instructions for accessing a database with a first number of virtual partitions, wherein accessing the database comprises mapping each of the first number of virtual partitions to one of a plurality of physical databases, the plurality of physical databases together forming the database;
instructions for associating a record identifier with each of a plurality of data records, the record identifier comprising a virtual partition identifier corresponding to one of the first number of virtual partitions in the database to which a data record of the plurality of data records is assigned; and
instructions for, in response to an increase in the first number of virtual partitions to a second number of virtual partitions, increasing a number of bits used in the virtual partition identifier without increasing a length of the record identifier associated with each of the plurality of data records.

9. The system of claim 8, wherein the instructions for increasing the number of bits used in the virtual partition identifier comprise instructions for using a bit from a plurality of buffer bits included in the record identifier.

10. The system of claim 8, wherein the record identifier further comprises a sequential identifier that identifies the data record within the virtual partition.

11. The system of claim 10, further comprising:
instructions for, in response to an increase in the size of the virtual partition, increasing the number of bits used in the sequential identifier without increasing the length of the record identifier associated with the plurality of data records by adding a bit to the sequential identifier from a plurality of buffer bits included in the record identifier.

12. The system of claim 8, wherein the virtual partition identifier is located in a first segment of the record identifier and a second segment of the record identifier comprises a sequential identifier for the data record.

13. The system of claim 12, wherein one of the virtual partition identifier and the sequential identifier has a least significant bit at a leftmost end and one of the virtual partition identifier and the sequential identifier has a least significant bit at a rightmost end.

14. The system of claim 8, wherein at least two of the virtual partitions are mapped to a same one of the physical databases.

15. A computer program product for use in conjunction with a computer system, the computer program product comprising a computer readable storage medium and a computer program mechanism embedded therein, the computer program mechanism comprising:
instructions for accessing a database with a first number of virtual partitions, wherein accessing the database comprises mapping each of the first number of virtual partitions to one of a plurality of physical databases, the plurality of physical databases together forming the database;
instructions for associating a record identifier with each of a plurality of data records, the record identifier comprising a virtual partition identifier corresponding to one of the first number of virtual partitions in the database to which a data record of the plurality of data records is assigned; and
instructions for, in response to an increase in the first number of virtual partitions to a second number of virtual partitions, increasing a number of bits used in the virtual partition identifier without increasing a length of the record identifier associated with each of the plurality of data records.

16. The computer program product of claim 15, wherein the instructions for increasing the number of bits used in the virtual partition identifier comprise instructions for using a bit from a plurality of buffer bits included in the record identifier.

17. The computer program product of claim 15, wherein the record identifier further comprises a sequential identifier that identifies the data record within the virtual partition.

18. The computer program product of claim 17, further comprising:
instructions for, in response to an increase in the size of the virtual partition, increasing the number of bits used in the sequential identifier without increasing the length of the record identifier associated with the plurality of data records by adding a bit to the sequential identifier from a plurality of buffer bits included in the record identifier.

19. The computer program product of claim 15, wherein the virtual partition identifier is located in a first segment of the record identifier and a second segment of the record identifier comprises a sequential identifier for the data record.

20. The computer program product of claim 19, wherein one of the virtual partition identifier and the sequential identifier has a least significant bit at a leftmost end and one of the virtual partition identifier and the sequential identifier has a least significant bit at a rightmost end.

* * * * *